June 20, 1933.   R. G. MARSHALL   1,914,378
FASTENER
Filed Oct. 16, 1931   2 Sheets-Sheet 1
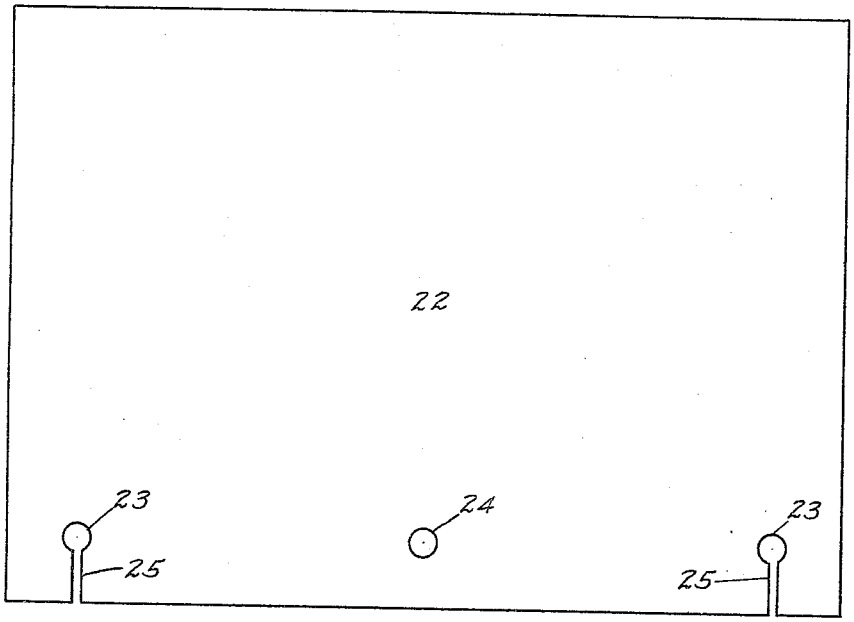
Fig. I
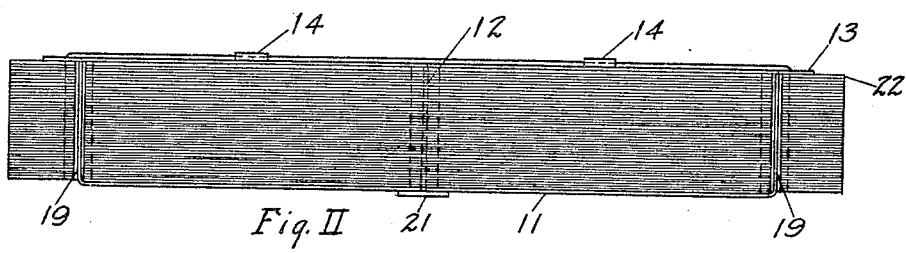
Fig. II
INVENTOR.
Richard G. Marshall
BY
ATTORNEY.

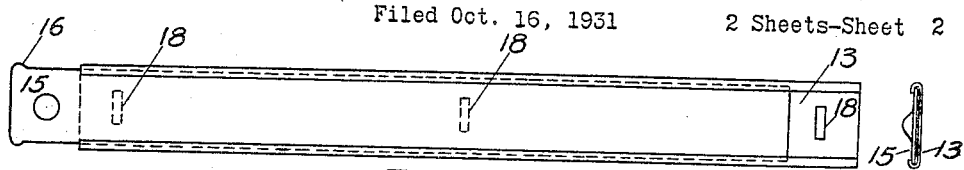
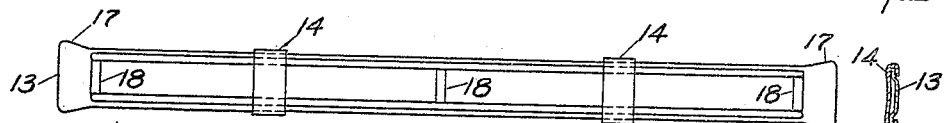
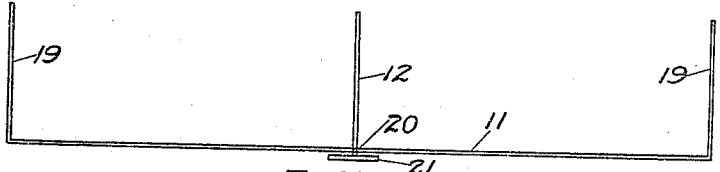
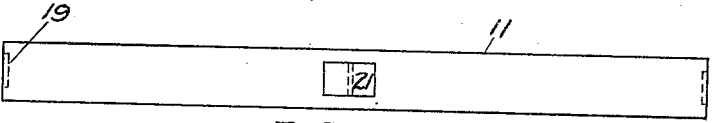
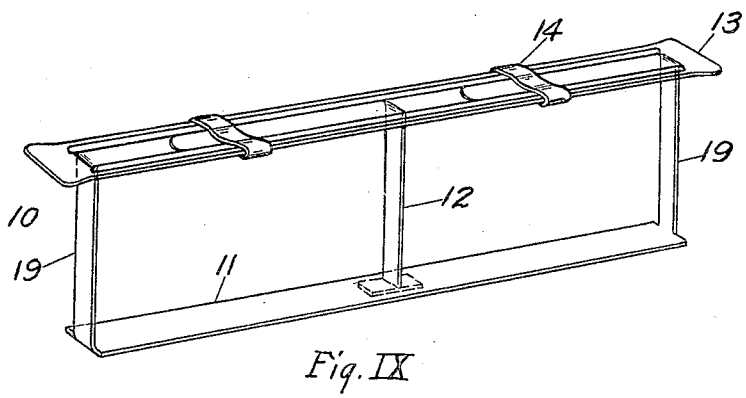

Patented June 20, 1933                                    1,914,378

UNITED STATES PATENT OFFICE

RICHARD G. MARSHALL, OF DETROIT, MICHIGAN

FASTENER

Application filed October 16, 1931. Serial No. 569,193.

This invention relates to fasteners and more particularly to fasteners adapted for use in connection with loose leaf binders and similar devices. The principal object of this invention is to provide a fastener suitable for use in loose-leaf binders which will permit the insertion into and withdrawal from the mid portion of the binder of loose leaves without the removal of the sheets on top of the inserted or withdrawn leaf. Another object of the invention is the provision of an improved type of locking device for fasteners of the character here under consideration.

Considerable inconvenience has been experienced in connection with the fasteners heretofore in use when it was desired to insert into or remove papers from the fasteners. These operations always required the complete undoing of the fasteners and frequently the removal and insertion of a considerable portion of the papers contained in the fastener. A constant undoing and refastening of the fasteners tends to destroy the shape of the fastening tongues to such an extent that ultimately they become unusable. Since the tongues normally are made integrally with a portion of the fastener, the usefulness of the entire fastener is destroyed by reason of the distortion of the tongue. Another objection to the fasteners for loose-leaf binders heretofore in use is the fact that the fastening tongues are secured against the keeper by means of narrow runners which permit the ends of the tongues to catch on papers being removed or inserted. This invention provides means for overcoming and eliminating all of these objections to and defects in the fasteners of the prior art.

For a more complete understanding of the invention reference may now be had to the drawings forming a part of this specification in which:

Figure 1 is a plan view of a sheet of paper properly prepared for use with the fastener embodying this invention.

Figure 2 is an end view in elevation showing a number of the sheets illustrated in Figure 1 secured together by means of the fastener embodying this invention.

Figure 3 is a plan view of the preferred form of keeper used in practicing this invention.

Figure 4 is an end view in elevation of the keeper shown in Figure 3.

Figure 5 is a plan view of a modified form of keeper.

Figure 6 is a cross sectional view of the keeper shown in Figure 5.

Figure 7 is a side view in elevation of the base member and removable tongue associated therewith used in practicing this invention.

Figure 8 is a plan view of the base and removable tongue shown in Figure 7 taken from the lower side of Figure 7.

Figure 9 is a perspective view of one form of the completely assembled fastener embodying this invention.

The complete fastener 10 embodying this invention comprises a base member 11, a keeper member 13, a removable tongue 12, and locking members 14 or 15. The keeper 13 as shown in Figures 5 and 6 has upturned and outwardly flanged lateral edges for the reception of the locking members 14 which are secured thereto by having their opposite extremities bent around the outwardly flanged edges thereof. In the preferred construction of the keeper and locking device illustrated in Figures 3 and 4 the keeper has its lateral edges bent inwardly forming a pair of grooves on the opposite sides thereof for the reception of the opposite edges of the locking member 15. One extremity of the locking member 15 may be slightly enlarged, as indicated at 16, to prevent it from sliding into the grooves formed in the keeper 13 beyond the end thereof. The opposite extremities of the keeper 13 used with the locking members 14 are slightly enlarged, as indicated at 17, to prevent the members 14 from being forced off the ends of the keeper. Substantially rectangular openings 18 which are spaced from each other and two of which are adjacent the extremities thereof, are formed in the keeper 13. While three openings are shown in the drawings and are preferred, it should be understood that there may be more or less as is desired.

The base 11 has formed integrally therewith at its opposite extremities a pair of upright flexible tongues 19 which are designed to project through the corresponding openings 18 in the keeper 13. As best shown in Figure 9, and in dotted lines in Figure 8, the tongues 19 are preferably narrower in width than the base 11. Midway between the tongues 19 and positioned in alignment with the central opening 18 in the keeper 13 is a substantially rectangular opening 20 through which the removable tongue 12 projects. The tongue 12 is provided at one extremity with a flat head 21 adapted to prevent it from being forced completely through the opening 20 and to secure it in position as will be described presently.

Figure 9 shows the base 11 and the removable tongue 12 assembled in locked position with the keeper and locking members illustrated in Figures 5 and 6. When in locked position the extremities of the tongues 19 remote from the base 11 are bent flat against the upper surface of the keeper 13 toward each other. The upper extremity of the removable tongue 12 is bent over the extremity of one of the tongues 19 and all of the tongues are then secured in position against the keeper 13 by means of the locking members 14 which are free to slide along the keeper within the limit of the extremities of the keeper. The locking members 14 slide freely upon the keeper 13 when not assembled with the tongues 19 and 12. When in assembled position, however, the locking members 14 bind sufficiently against the extremities of the tongues 19 and 12 to prevent their unintentional removal. While only two locking members 14 have been shown, it should be understood that more or less may be used if desired.

While a keeper of the type illustrated in Figure 5 and shown in assembled position in Figure 9 may be used satisfactorily with the removable tongue 12, it has the disadvantage of not completely covering the ends of the tongues 19 and 12. These ends, after some use, have a tendency to bend away from the keeper and present projections which are easily caught on papers and articles of clothing, as for example, the sleeve of a person using the fastener. The keeper and locking device 15 illustrated in Figures 3 and 4 are designed to eliminate this objection. As is apparent from an examination of Figure 3 the locking device 15 would completely cover the extremities of the tongues 19 and 12 when they are in their locked position.

The sheets of paper or leaves 22 used with the fastener 10 are provided with openings 23 and 24 spaced identical with the openings 18 in the keeper 13. The openings 23 communicate with the edge of the sheets 22 by means of transverse slots 25. Figure 2 shows a number of sheets 22 bound together by means of the fastener 10. As shown in that figure the tongues 19 project through the openings 23 and the removable tongue 12 projects through the opening 24 in the sheets 22.

When it is desired to remove a sheet from the mid portion of the binder shown in Figure 2, all that it is necessary to do is to unlock the tongue 12 by removing the locking member 14 and withdraw it completely from the fastener. With the tongue 12 removed from the fastener it will be apparent that any of the sheets 22 may be readily withdrawn since the slots 25 permit the sheet to come away from the tongues 19 without tearing or mutilating them. Likewise, new sheets 22 may readily be inserted into the binder by directing the sheets so that the tongues 19 will pass through the slots 25 into the openings 23. When the sheet is so positioned in the binder the removable tongue 12 is reinserted into the opening 20 in the base 11 through the openings 24 in the leaves and central opening 18 in the keeper 13. The free extremity of the tongue may then be bent flat against the upper surface of the keeper and secured in that position by means of one of the locking members 14. Although sheets may be inserted or withdrawn readily when the removable tongue 12 is withdrawn, they are firmly held in place when it is in position. A large book may be suspended from an ordinary sheet of paper fastened in the book with this fastener.

From the foregoing description it will be understood that the only tongue which is subjected to any appreciable amount of bending is the removable tongue 12. The permanent tongues 19 which are integrally connected to the base 11 need be flexed only slightly from time to time to permit the expansion or contraction of the binder as a whole. Should the removable tongue 12 become distorted to any great extent whereby its usefulness is destroyed, it can be replaced readily without the replacement of the other parts of the fastener. This invention, therefore, provides a fastening device for use in connection with loose-leaf binders and similar devices which permits the insertion into or removal from the binder of papers without taking the binder completely apart. It also eliminates the objectionable features of fasteners heretofore in use in which the integral tongues rapidly become distorted upon use and on which the extremities of the tongues projected from the fastener in a manner whereby they might catch or hook on to any paper or garment passed near them.

While only the preferred embodiments of this invention have been shown and described it will, of course, be understood that the invention is not limited thereto but is co-extensive with the scope of the appended claims.

I claim:

1. A fastener comprising a base having a pair of tongues at its opposite ends, a keeper provided with openings adapted to receive said tongues, said keeper and said base having aligned openings therein, an intermediate removable tongue extending through said aligned openings, the end portion of each of said tongues remote from said base being adapted to be bent flat against said keeper, locking means movable upon said keeper and engageable over the bent ends of said tongues, said tongues being so positioned and proportioned that the bent end of said intermediate tongue overlaps one of said base tongues, and said locking means being positionable over the ends of said intermediate and base tongues.

2. A fastener comprising a base having a pair of bendable tongues integrally connected thereto at its opposite ends, a keeper provided with openings adapted to receive said tongues, said keeper and said base having aligned openings therein, an intermediate removable tongue extending through said aligned openings, the end portion of each of said tongues remote from said base being adapted to be bent flat against said keeper, locking members slidable upon said keeper and slidably engageable over the bent ends of said tongues, said tongues being so positioned and proportioned that the intermediate tongue is selectively positionable in overlapping relation with either of said base tongues and lockingly engageable by either of said locking members when said locking members are in their locking positions upon the respective base tongues.

In testimony whereof, he has affixed his signature.

RICHARD G. MARSHALL.